Nov. 15, 1932.  J. W. WINTER  1,888,192
LIQUID DISPENSING APPARATUS
Filed June 16, 1931   3 Sheets-Sheet 1
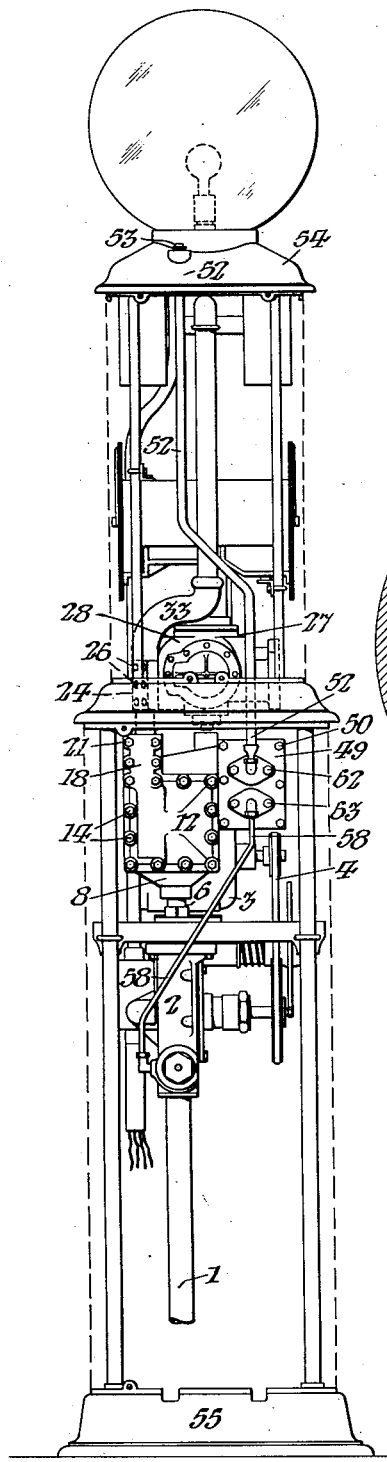
FIG. I.
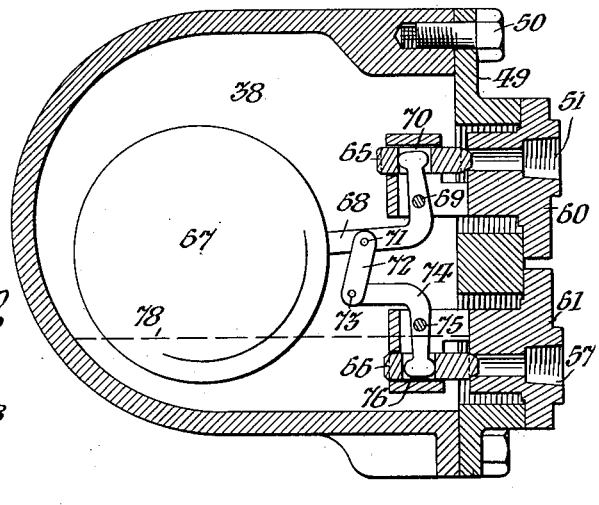
FIG. V.
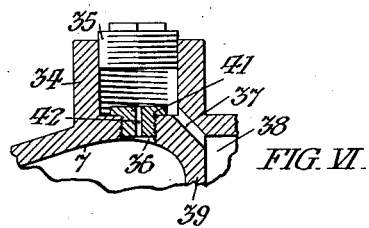
FIG. VI.
INVENTOR:
JOSEPH WILLIAM WINTER,
BY

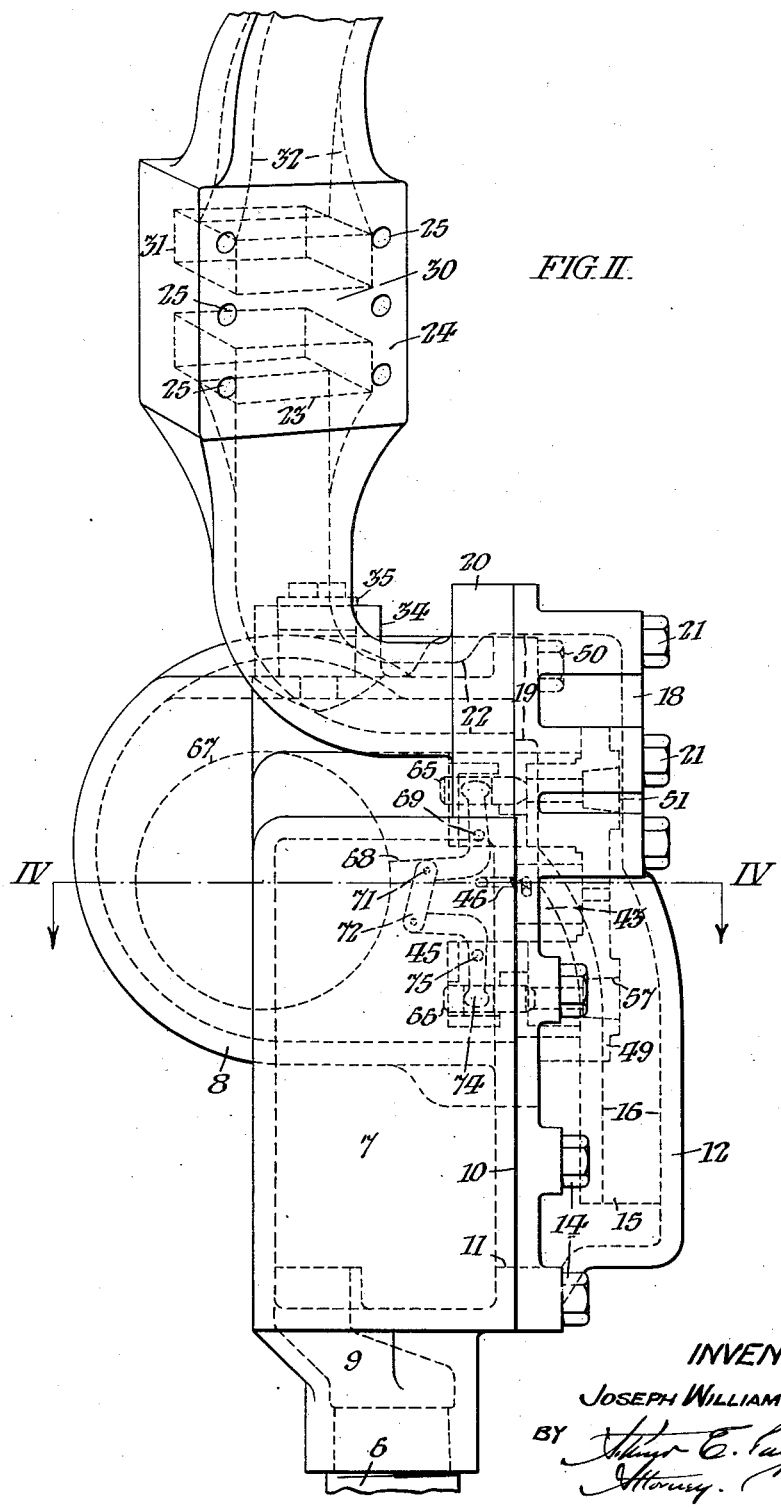

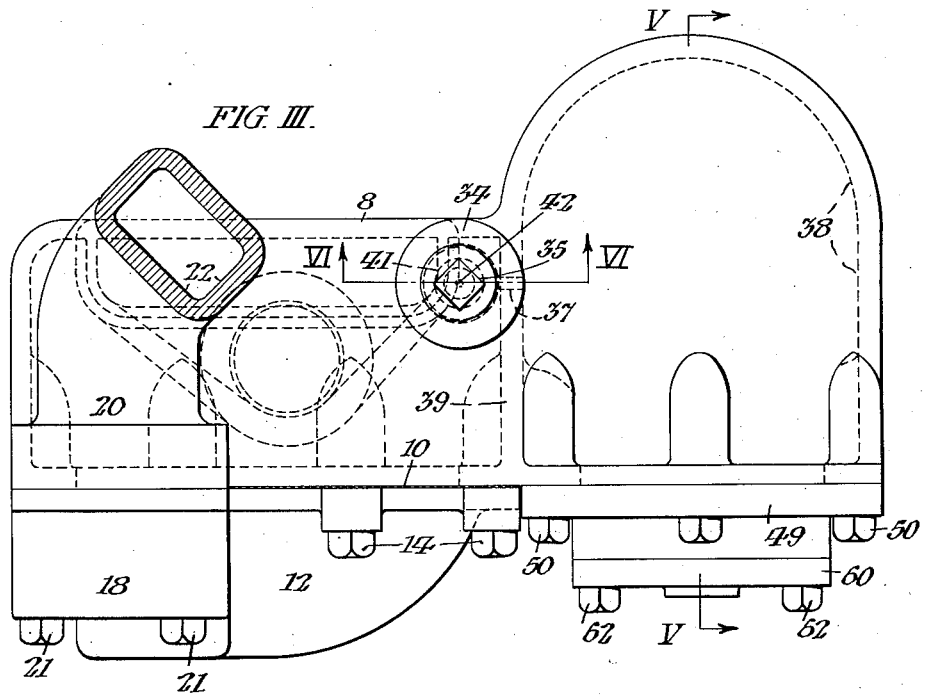

Patented Nov. 15, 1932

1,888,192

UNITED STATES PATENT OFFICE

JOSEPH WILLIAM WINTER, OF PENFIELD, PENNSYLVANIA, ASSIGNOR TO JOHN WOOD MANUFACTURING COMPANY, OF CONSHOHOCKEN, PENNSYLVANIA, A CORPORATION OF PENNSYLVANIA

LIQUID DISPENSING APPARATUS

Application filed June 16, 1931. Serial No. 544,797.

My invention may be advantageously employed in apparatus for dispensing gasolene by means of a pump which extracts the liquid from a subjacent tank and delivers it under pressure through a meter and dispensing hose. Said meter includes a rotatable index pointer adapted to traverse a circular series of graduations on a dial to indicate gallons and fractions thereof dispensed, and said pointer is turned in accordance with the flow of fluid through said meter. In some localities the law requires the inclusion of a transparent container between the pump and the hose through which the liquid must pass and in which the purchaser may observe whether or not liquid is being delivered to the hose. If there is a leak in the suction line from the subjacent tank to the pump, air is drawn into the liquid conduit and is manifested by bubbles in the liquid passing through the container and, under some circumstances, bubbles of vapor of the liquid being dispensed may similarly appear. Of course, the passage of air or other gas through the metering pump, in lieu of liquid, renders the manifestation of the amount dispensed erroneous. Therefore, the principal purpose and effect of my invention is to insure the delivery of liquid without the inclusion of bubbles of air or vapor and to the full amount indicated by the meter.

As hereinafter described, the essential feature of my invention is that means are provided for separating the liquid from any lighter fluid, such as air or vapor of the liquid, on its way from the subjacent tank to the meter and to insure that only liquid shall be delivered to the meter and dispensed therethrough. Such means includes what I hereinafter term a gas eliminator in the liquid supply conduit leading from the pump to the meter and which includes a foraminous screen gas trap through which the liquid is pumped with the effect of separating air and other gas bubbles from it. The gas thus separated is withdrawn from said trap through a small conduit leading into a float chamber having a gas vent opening near the top thereof. Said vent is normally open to the atmosphere, to permit the escape of gas thus separated from the liquid, but said vent is provided with a valve adapted to prevent the discharge of any liquid therethrough by connection of the valve with a float in said chamber which is uplifted to close the vent valve if and when there is any abnormal accumulation in the float chamber of liquid which has been entrained with the gas in its passage from the trap to said float chamber and precipitated in the bottom of the latter as the gas escapes. Any such liquid carried over into the float chamber is normally withdrawn back into the dispensing system, free from gas, by means of a small conduit leading from the bottom of the float chamber to the suction side of said liquid pump, and controlled like said vent.

This invention is an improvement upon that disclosed in my application Serial No. 478,620 filed August 29, 1930, for Letters Patent of the United States for improvement in liquid dispensing apparatus, in that it is so constructed and arranged that all of the internal parts of the gas eliminator are accessible upon removal of a substantially flat closure of one side of the eliminator casing, which is directly accessible through a doorway in the side of the pump stand, and both valves respectively controlling the discharge of gas and liquid from the eliminator are arranged to control ports in a single removable cover of said casing which cover is in effect a side wall of the float chamber in said eliminator casing; and the liquid discharge outlet from said eliminator casing is directly connected with the suction side of said pump.

My invention includes the various novel features of construction and arrangement hereinafter more definitely specified.

In said drawings; Fig. I is a side elevation of what is known to the trade as a curb stand, containing a convenient embodiment of my invention; the sheet metal casing of said stand being omitted to show the internal mechanism.

Fig. II is an elevation of the left hand side of the gas eliminator and its appurtenances shown in Fig. I, but on a larger scale.

Fig. III is a plan view of said eliminator.

Fig. IV is a plan sectional view of said eliminator taken on the line IV, IV, in Fig. II.

Fig. V is a vertical sectional view of the float chamber of said eliminator, taken on the line V, V, in Fig. III.

Fig. VI is a fragmentary vertical sectional view taken on the line VI in Fig. III, showing a restricted gas passage.

In said figures; the liquid to be dispensed is stored in an underground tank from which it is withdrawn through the conduit 1 by and to the pump 2 which is conveniently electrically operated by the motor 3 connected therewith by the belt 4.

Said pump 2 discharges the liquid through the conduit 6 into the screen trap chamber 7 in the eliminator casing 8, through the inlet port 9 which is wedge shaped as indicated in Fig. II, at its lower end, and is elongated at its upper end as indicated in Fig. IV, so as to extend a considerable distance across said chamber 7. The purpose of that shape is to uniformly distribute the incoming liquid in said chamber 7, with respect to the entire area of the foraminous screen 10, conveniently a woven wire fabric of extremely fine mesh. Said screen is rectangular and extends over the outlet 11 in said trap chamber 7, as shown in Fig. IV. Said screen is held in fluid tight relation with said casing 8 by the cover 12 which is rigidly but removably connected with said casing 8 by the twelve cap bolts 14 shown in Fig. I, two of which are indicated in Fig. IV.

The outlet port 15, in said cover 12, for the liquid which passes through said screen 10, is at the lower end of the outlet conduit 16 which is conveniently cast in unitary relation with said cover, as indicated in Figs. II and IV. The construction and arrangement of said inlet port 9 and outlet port 15 are such that the liquid flows into said screen chamber 7 at the left, upward along the left hand wall thereof shown in Fig. II, strikes the upper wall of the screen chamber 7 and returns downward along the face of said screen 10 toward the bottom of the latter so as to pass through said screen substantially uniformly with respect to its entire area; such downward flow of the liquid with respect to the screen being induced by the location of the outlet port near the bottom thereof.

As shown in Figs. I and II; said cover 12 has the upward extension 18, at the left hand side thereof in Fig. I, containing said conduit 16 which terminates in the port 19 indicated in Fig. II, in registry with the conduit coupling 20 which is detachably rigidly connected therewith by the four tap bolts 21 in said extension 18.

As shown in Fig. II, said coupling 20 has the passageway 22 terminating in the port 23 in the manifold pad 24, which is shown slightly distorted in that figure. Said manifold has six holes 25 for tap bolts 26 which hold it with said port 23, in registry with the liquid inlet port leading into the meter casing 27 shown in Fig. I, between adjoining cylinders 28 on said casing. There is a circular series of four such cylinders on said casing, inclosing four reciprocatory pistons driven by the flow of the liquid. Said manifold has, separated from said port 24 by the partition 30, the port 31 which registers with the outlet port from said meter casing and leads into the passageway 32, shown in Fig. II, in communication with the conduit 33, shown in Fig. I. Said conduit 33 leads, through a sight gage, to a flexible dispensing hose provided with a nozzle controlled by a nozzle valve, as described at length in my copending application aforesaid.

The effect of pumping the liquid through said foraminous screen 10 is to separate from the liquid entrained bubbles of air or other gas; which rises to the top of the screen chamber 7 as the liquid passes downward with respect to said screen 10 in said chamber 7 on its way out through said port 15 in said cover 12, shown in Fig. II. As shown in Figs. III and VI; said eliminator casing 8 has, preferably in unitary relation therewith, at the top of said screen chamber 7, the cup 34 provided with the removable closure 35, which is conveniently a screw plug. Said casing 8 has the passageway 36, 37 leading from said screen chamber 7 into the float chamber 38 which, as shown in Fig. IV, is formed in said eliminator casing 8 and separated from said screen chamber 7 by the partition 39. The tubular screw threaded bushing 41 which is detachably fitted in said passageway 36, has the restricted passageway 42 therethrough and constitutes removable means in said cup 34 restricting the effective area of said passageway 36, 37. By substitution of bushings with different sized passageways 42 therethrough, such restriction is variable to attain the most efficient elimination of air and other gas from the liquid, with the minimum discharge of liquid therewith through the passageway 36, 37 into said chamber 38; in any liquid dispensing apparatus.

Although, under normal conditions, all of the air or other gas is thus eliminated from the liquid which flows through said screen 10, and finds its way into said float chamber 38 through the passageway 36, 37; under some abnormal conditions there may be a slight accumulation of such gas at the top of the chamber 43 in said cover 12, shown in Figs. II and IV. Therefore, I provide another passageway 45, 46 which, as shown in Fig. IV, extends through said cover 12, screen 10, and casing 8 into the float chamber 38. I prefer to provide means to also variably restrict that passageway, by means of the tubular plug 47 adjoining the screen 10 in said cover 12. It is to be understood that plugs 47 having passageways of different sizes therethrough may be interchangeably fitted in the passageway 45 to attain the most efficient effect of the latter. The purpose of said passageways 36, 37 and 45, 46 is to eliminate from the stream of liquid on its way to be dispensed, and direct into said float chamber 38, only the air or other gas which is entrained with the liquid before it strikes said screen 10. However, with the air and other gas thus eliminated from the stream of liquid being dispensed, there is deposited in said float chamber 38 a small amount of the liquid and, therefore, I provide means to normally discharge the eliminated gas from said float chamber 38 into the atmosphere and to intermittently discharge from said float chamber 38, back into the liquid conduit, on the suction side of said pump 2, the small amount of liquid which thus accumulates in said float chamber 38.

As shown in Figs. I and V, said float chamber 38 is provided with a removable cover 49 upon the same side of the eliminator casing 8 as said cover 12, and secured to said casing by the six tap bolts 50 indicated in Fig. I. Said cover 49 has the gas vent 51 shown in Fig. V which is in communication with the gas vent conduit 52, shown in Fig. I, terminating in the perforated cap 53 at the top of the hood 54 on the curb stand 55; so that any air or vapors of gasolene vented from said float chamber 38 is discharged into the outer atmosphere above said dome 54. Said cover 49 also has the liquid vent 57 in communication with the conduit 58, shown in Fig. I, leading back to the suction side of said pump 2; so that when said vent 57 is open, any liquid which has passed over into said float chamber 38 with the gas aforesaid is drawn back into the liquid stream through said vent 57 and conduit 58.

As shown in Figs. I and V, said vents 51 and 57 are formed in respective valve bearings 60 and 61 which are respectively detachably rigidly connected with said cover 49 by tap bolts 62 and 63, as shown in Fig. I. As shown in Fig. V; said bearings 60 and 61 respectively support the gas vent valve 65 and the liquid vent valve 66 for reciprocation in parallel relation and means for alternately opening and closing said ports 51 and 57 by said valves 65 and 66, by cooperative connection with the single float 67 in said float chamber 38. Such means for alternately operating said valves include the lever 68 which is rigidly connected with said float, fulcrumed on the shaft 69 in said valve bearing 60 and has its upper end extending in the slot 70 in said gas vent valve 65. Said lever 68 is connected by the pivot 71 with the link 72 connected by the pivot 73 with the lever 74 which is fulcrumed on the shaft 75 in said valve bearing 61 and has its lower end engaged in the slot 76 in said liquid vent valve 66.

The arrangement last above described is such that the weight of said float 67 normally holds said gas vent valve 65 open and said liquid vent valve 66 shut. Said float chamber 38, with said liquid vent valve 66 and float 67, thus form a trap for the liquid which finds its way into said chamber with the gas which it is desired to eliminate, and the trapped liquid indicated by the dotted line 78 shown in Fig. V, is thus retained in said float chamber 38 by the liquid vent valve 66 in closed position while the gas is permitted to escape from said chamber through the vent 51 while the gas vent valve 65 is in open position. However, when the liquid rises to a predetermined level above that indicated at 78 in Fig. V and which is such as to submerge the vent 57; the float 67 is thereby lifted to open said liquid vent valve 66 from said vent 57 and permit the liquid to be withdrawn from said chamber 38 by the suction of the pump 2 until the float 67 is lowered to its normal position shown in Fig. V, whereupon, said liquid vent 57 is closed as shown in said figure without permitting the withdrawal of any fluid from said float chamber 38 other than the liquid. That is important, because if such means were not provided, fluid other than liquid might be sucked back into the liquid line by the pump 2 from said float chamber 38 and the purpose of the eliminator thus defeated.

The construction and arrangement shown in Fig. V are such that the intermittent opening of the liquid vent valve 66, as above described, is effected without closing the gas vent 51 by the gas vent valve 65. However, if under any abnormal condition, the liquid is deposited in said float chamber 38 at a rate in excess of its normal intermittent withdrawal through said liquid vent 57; the float 67 is raised by the liquid deposited in said float chamber 38 to an abnormal height and sufficient to temporarily close the gas vent 51 by the gas vent valve 65 to thus prevent any possible discharge of liquid through the gas vent conduit 52.

The construction and arrangement above described have not only the advantage that all of the internal parts of the gas eliminator are accessible upon removal of the substantially flat closures 12 and 49 to permit the removal and cleaning of the screen 10 by removal of only the cover 12, without disturbance of the other portions of the apparatus; and to permit the removal and replacement of the float valve mechanism aforesaid by removal of the cover 49, without disturbance of any other portion of the apparatus; but such construction and arrangement lessen the cost of manufacture of the vent valve controlling mechanism and facilitate the assembling of the parts thereof as compared with the form of gas eliminator shown in my copending application aforesaid.

Therefore, I do not desire to limit myself to the precise details of construction and arrangement herein set forth, as it is obvious that various modifications may be made therein without departing from the essential features of my invention, as defined in the appended claims.

I claim:

1. A gas eliminator for liquid dispensing apparatus including a casing comprising a screen chamber and a float chamber, both open at the same side of said casing; a cup at the top of said screen chamber; a removable closure for said cup; said casing having a passageway leading from said screen chamber to said float chamber through said cup; and removable means in said cup restricting the effective area of said passageway; a cover for said screen chamber, forming a gas outlet chamber and a liquid outlet passageway from said gas outlet chamber; a screen covering the opening between said screen chamber and said gas outlet chamber in said cover; means securing said screen in fluid tight relation with said casing and cover by compression of the latter upon said casing; said casing and cover having complementary passageways at the upper end of said gas chamber, leading from said gas chamber in said cover through said screen and casing into said float chamber; means in said cover restricting the latter passageway; a cover for said float chamber opening having a gas vent and a liquid vent, and parallel valve bearings local to the respective vents; a gas vent valve and a liquid vent valve mounted to reciprocate in parallel relation in said cover and respectively controlling said vents; a single float in said float chamber; and means operatively connecting said single float with both of said valves; whereby said liquid vent is normally closed by its valve, held by said float, and said float chamber forms a liquid trap, and said gas vent valve is normally held open by said float, but said float is adapted to be uplifted by liquid caught in said trap to close said gas vent and open said liquid vent when the liquid in said trap reaches a predetermined level.

2. Apparatus as in claim 1; wherein said gas vent valve and said liquid vent valve are respectively provided with operating levers, and a link pivotally cooperatively connecting said levers; and said float is operatively connected with said gas vent valve lever at the end thereof remote from that valve; whereby both of said valves are adapted to be alternately opened and closed by the same float.

3. In a gas eliminator for liquid dispensing apparatus, the combination with a casing comprising a screen chamber and a float chamber with separate respective openings from said chambers in the same side wall of said casing, and a restricted gas passage from the top of said screen chamber to said float chamber; of a plane foraminous screen covering said screen chamber opening; a removable cover for said screen chamber opening and screen, forming a gas outlet chamber, having a liquid outlet port leading from the bottom of said screen to the top of that cover, and having a restricted gas passageway leading from the top of the screen through said cover and casing to said float chamber; a removable cover for said float chamber opening, having a gas vent and a liquid vent therethrough; a gas vent valve and a liquid vent valve mounted to reciprocate in parallel relation in said last named cover and respectively controlling said vents; a single float in said float chamber; and means operatively connecting said single float with both of said valves; whereby said liquid vent is normally closed by its valve, held by said float, and said float chamber forms a liquid trap, and said gas vent valve is normally held open by said float, but said float is adapted to be uplifted by liquid caught in said trap, to close said gas vent and open said liquid vent, when the liquid in said trap reaches a predetermined level.

4. A gas eliminator for liquid dispensing apparatus including a casing comprising a screen chamber and a float chamber, both open at the same side of said casing; said casing having a passageway leading from said screen chamber to said float chamber; a cover for said screen chamber, forming a gas outlet chamber and a liquid outlet passageway separate from said gas outlet chamber; a screen covering the opening between said screen chamber and said gas outlet chamber in said cover; means securing said screen in fluid tight relation with said casing and cover by compression of the latter upon said casing; a cover for said float chamber opening having a gas vent and a liquid vent; a gas vent valve and a liquid vent valve for respectively controlling said vents; a single float in said float chamber; and means operatively connecting said single float with both of said valves; whereby said float chamber forms a liquid trap and said liquid vent is normally closed by its valve, held by said float, and said gas vent valve is normally held open by said float, but said float is adapted to be uplifted by liquid caught in said trap to close said gas vent and open said liquid vent when the liquid in said trap reaches a predetermined level.

5. In a gas eliminator for liquid dispensing apparatus, the combination with a casing comprising a screen chamber and a float chamber with separate respective openings from said chambers in the same side wall of said casing, and a gas passage from the top of said screen chamber to said float chamber; of a plane foraminous screen covering said screen chamber opening; a removable cover for said screen chamber opening and screen, forming a fluid outlet chamber and having a liquid outlet port leading from the bottom of said screen, and a gas passage to said float chamber; a removable cover for said float chamber opening, having a gas vent and a liquid vent; a gas vent valve and a liquid vent valve for respectively controlling said vents; a single float in said float chamber; and means operatively connecting said single float with both of said valves; whereby said liquid vent is normally closed by its valve, held by said float, and said float chamber forms a liquid trap, and said gas vent valve is normally held open by said float, but said float is adapted to be uplifted by liquid caught in said trap, to close said gas vent and open said liquid vent, when the liquid in said trap reaches a predetermined level.

6. In a gas eliminator for liquid dispensing apparatus, the combination with a casing comprising a screen chamber and a float chamber with separate respective openings from said chambers in the same side wall of said casing, and a gas passage from the top of said screen chamber to said float chamber; of a plane foraminous screen covering said screen chamber opening; a removable cover for said screen chamber opening and screen, forming a fluid outlet chamber and having a liquid outlet port leading from the bottom of said screen; a removable cover for said float chamber opening, having a gas vent and a liquid vent; a gas vent valve and a liquid vent valve for respectively controlling said vents; a single float in said float chamber; and means operatively connecting said single float with both of said valves; whereby said liquid vent is normally closed by its valve, held by said float, and said float chamber forms a liquid trap, and said gas vent valve is normally held open by said float, but said float is adapted to be uplifted by liquid caught in said trap, to close said gas vent and open said liquid vent, when the liquid in said trap reaches a predetermined level.

In testimony whereof, I have hereunto signed my name at Conshohocken, Pennsylvania, this twelfth day of June, 1931.

JOSEPH WILLIAM WINTER.